(12) United States Patent
Nygren et al.

(10) Patent No.: US 6,871,780 B2
(45) Date of Patent: Mar. 29, 2005

(54) SCALABLE DISTRIBUTED DATABASE SYSTEM AND METHOD FOR LINKING CODES TO INTERNET INFORMATION

(75) Inventors: Kaj Nygren, Stockholm (SE); Thomas Stephanson, Solna (SE); Roger Skagerwall, Enskede (SE)

(73) Assignee: AirClic, Inc., Newtown, PA (US)

( * ) Notice: Subject to any disclaimer, the term of this patent is extended or adjusted under 35 U.S.C. 154(b) by 269 days.

(21) Appl. No.: 09/993,960

(22) Filed: Nov. 27, 2001

(65) Prior Publication Data

US 2002/0063150 A1 May 30, 2002

Related U.S. Application Data

(60) Provisional application No. 60/252,906, filed on Nov. 27, 2000.

(51) Int. Cl.[7] ............................. G06F 7/00; G06F 17/00
(52) U.S. Cl. ......................... 235/375; 235/376; 705/25
(58) Field of Search ................................. 235/375, 376, 235/462.25, 462.2; 707/3, 104.1; 705/25, 26; 709/219

(56) References Cited

U.S. PATENT DOCUMENTS

| | | |
|---|---|---|
| 4,042,113 A | 8/1977 | Duncan et al. |
| 4,752,675 A | 6/1988 | Zetmeier |
| 4,797,818 A | 1/1989 | Cotter |
| 4,964,043 A | 10/1990 | Galvin |
| 5,122,959 A | 6/1992 | Nathanson et al. |
| 5,237,157 A | 8/1993 | Kaplan |
| 5,278,396 A | 1/1994 | McGaha |
| 5,434,394 A | 7/1995 | Roach et al. |
| 5,444,444 A | 8/1995 | Ross |
| 5,478,989 A | 12/1995 | Shepley |
| 5,496,071 A | 3/1996 | Walsh |
| 5,539,635 A | 7/1996 | Larson, Jr. |
| 5,583,487 A | 12/1996 | Ackerman et al. |
| 5,583,994 A | 12/1996 | Rangan |

(Continued)

FOREIGN PATENT DOCUMENTS

| | | |
|---|---|---|
| EP | 856812 A2 | 8/1998 |
| EP | 856812 A3 | 5/1999 |

(Continued)

OTHER PUBLICATIONS

BoatUS.com and BoatTraderOnline.com Launch Marketing Alliance (http://proquest.umi.com/pqdweb?RQT=309& VInst=PROD&VName=PQD&VType=PQD&Fmt=3&did= 000000053560537&cliend=19649).*

(Continued)

Primary Examiner—Karl D. Frech
Assistant Examiner—Daniel Walsh
(74) Attorney, Agent, or Firm—Morgan, Lewis & Bockius LLP

(57) ABSTRACT

An end-user is directed to a location on the Internet based on machine-readable codes scanned by the end user. The end-user is associated with at least one of the following: an end-user country selection, and end-user language selection, a service category, an access media type, and the presence of an access certificate. A database with a plurality of entries is provided. Each of the entries is associated with a machine-readable code and includes one or more different network addresses. Code information associated with the scans of machine readable codes made by the end-user is received at a network site. In response to the scan information, entries associated with the machine-readable codes scanned by the end-user are retrieved from the database. At least some of the entries include information irrelevant to the information associated with the end user. Only relevant entries are selected. The end user is connected with the network addresses selected.

20 Claims, 10 Drawing Sheets

U.S. PATENT DOCUMENTS

| | | |
|---|---|---|
| 5,611,051 A | 3/1997 | Pirelli |
| 5,624,265 A | 4/1997 | Redford et al. |
| 5,625,776 A | 4/1997 | Johnson |
| 5,630,125 A | 5/1997 | Zellweger |
| 5,640,193 A | 6/1997 | Wellner |
| 5,657,222 A | 8/1997 | Randolph |
| 5,664,110 A | 9/1997 | Green et al. |
| 5,694,551 A | 12/1997 | Doyle et al. |
| 5,696,898 A | 12/1997 | Baker et al. |
| 5,715,314 A | 2/1998 | Payne |
| 5,761,499 A | 6/1998 | Sonderegger |
| 5,804,803 A | 9/1998 | Cragun et al. |
| 5,825,002 A | 10/1998 | Roslak |
| 5,832,457 A | 11/1998 | O'Brien et al. |
| 5,848,413 A | 12/1998 | Wolff |
| 5,860,068 A | 1/1999 | Cook |
| 5,869,819 A | 2/1999 | Knowles et al. |
| 5,870,552 A | 2/1999 | Dozier et al. |
| 5,872,588 A | 2/1999 | Aras et al. |
| 5,890,136 A | 3/1999 | Kipp |
| 5,893,910 A | 4/1999 | Martineau et al. |
| 5,899,700 A | 5/1999 | Williams et al. |
| 5,905,248 A | 5/1999 | Russell et al. |
| 5,905,251 A | 5/1999 | Knowles |
| 5,907,836 A | 5/1999 | Sumita et al. |
| 5,913,210 A | 6/1999 | Call |
| 5,918,211 A | 6/1999 | Sloan |
| 5,930,474 A | 7/1999 | Dunworth et al. |
| 5,930,768 A | 7/1999 | Hooban |
| 5,933,829 A | 8/1999 | Durst et al. |
| 5,937,404 A | 8/1999 | Csaszar et al. |
| 5,938,727 A | 8/1999 | Ikeda |
| 5,940,074 A | 8/1999 | Britt, Jr. et al. |
| 5,940,595 A | 8/1999 | Reber et al. |
| 5,950,173 A | 9/1999 | Perkowski |
| 5,956,483 A | 9/1999 | Grate et al. |
| 5,957,695 A | 9/1999 | Redford et al. |
| 5,963,916 A | 10/1999 | Kaplan |
| 5,966,440 A | 10/1999 | Hair |
| 5,969,324 A | 10/1999 | Reber |
| 5,970,469 A | 10/1999 | Scroggie et al. |
| 5,974,222 A | 10/1999 | Yuen et al. |
| 5,978,773 A | 11/1999 | Hudetz et al. |
| 5,979,757 A | 11/1999 | Tracey et al. |
| 5,983,199 A | 11/1999 | Kaneko |
| 5,983,221 A | 11/1999 | Christy |
| 5,987,440 A | 11/1999 | O'Neil et al. |
| 5,991,737 A | 11/1999 | Chen |
| 5,992,752 A | 11/1999 | Wilz, Sr. et al. |
| 5,995,105 A | 11/1999 | Reber et al. |
| 6,006,242 A | 12/1999 | Poole et al. |
| 6,006,252 A | 12/1999 | Wolfe |
| 6,011,949 A | 1/2000 | Shimomukai |
| 6,012,102 A | 1/2000 | Shachar |
| 6,026,375 A | 2/2000 | Hall et al. |
| 6,027,024 A | 2/2000 | Knowles |
| 6,029,141 A | 2/2000 | Bezos et al. |
| 6,031,621 A | 2/2000 | Binder |
| 6,032,130 A | 2/2000 | Alloul et al. |
| 6,032,195 A | 2/2000 | Reber et al. |
| 6,034,680 A | 3/2000 | Kessenich et al. |
| 6,038,552 A | 3/2000 | Fleischl et al. |
| 6,045,048 A | 4/2000 | Wilz, Sr. et al. |
| 6,049,835 A | 4/2000 | Gagnon |
| 6,064,979 A | 5/2000 | Perkowski |
| 6,076,733 A * | 6/2000 | Wilz et al. ............. 235/462.01 |
| 6,101,483 A | 8/2000 | Petrovich et al. |
| 6,123,259 A | 9/2000 | Ogasawara |
| 6,134,548 A | 10/2000 | Gottsman et al. |
| 6,137,950 A | 10/2000 | Yuen |
| 6,144,848 A | 11/2000 | Walsh et al. |
| 6,148,331 A | 11/2000 | Parry |
| 6,152,369 A | 11/2000 | Wilz, Sr. |
| 6,154,738 A | 11/2000 | Call |
| 6,160,989 A | 12/2000 | Hendricks et al. |
| 6,199,048 B1 * | 3/2001 | Hudetz et al. ................ 705/23 |
| 6,233,682 B1 | 5/2001 | Fritsch |
| 6,246,997 B1 | 6/2001 | Cybul et al. |
| 6,263,313 B1 | 7/2001 | Milsted |
| 6,311,214 B1 | 10/2001 | Rhoads |
| 6,356,905 B1 | 3/2002 | Gershman et al. |
| 6,384,744 B1 | 5/2002 | Philyaw et al. |
| 6,412,695 B1 | 7/2002 | Reber |
| 6,463,585 B1 | 10/2002 | Hendricks et al. |
| 6,484,943 B1 | 11/2002 | Reber |
| 6,542,933 B1 | 4/2003 | Durst, Jr. et al. |
| 6,760,746 B1 * | 7/2004 | Schneider .................. 709/203 |
| 2001/0011233 A1 | 8/2001 | Narayanaswami |
| 2001/0013011 A1 | 8/2001 | Day et al. |
| 2001/0014868 A1 | 8/2001 | Herz et al. |
| 2001/0027472 A1 | 10/2001 | Guan |
| 2001/0032251 A1 | 10/2001 | Rhoads et al. |
| 2001/0054009 A1 * | 12/2001 | Miller et al. .................. 705/26 |
| 2002/0062261 A1 | 5/2002 | Mukei |
| 2003/0018468 A1 * | 1/2003 | Johnson et al. ................ 704/8 |
| 2003/0019935 A1 | 1/2003 | Giannulli |
| 2003/0061060 A1 * | 3/2003 | Tenorio ........................ 705/1 |

FOREIGN PATENT DOCUMENTS

| | | |
|---|---|---|
| WO | WO 95/26536 A | 10/1995 |
| WO | WO9526536 | 10/1995 |
| WO | WO 97/01137 | 9/1997 |
| WO | WO9701137 | 9/1997 |
| WO | 98/20411 | 5/1998 |
| WO | WO 99/16060 | 1/1999 |
| WO | WO9916060 | 1/1999 |
| WO | WO9917230 | 4/1999 |
| WO | 01/35410 | 5/2001 |
| WO | 02/44956 | 6/2002 |

OTHER PUBLICATIONS

Vollum, R.B. "43 Ways Computers Can Help You," (Abstract only), Purchasing World, vol. 27, No. 6, pp. 81–82 Jun. 1983.

Anon., "Octel Communications Offers a Multi–Function Call Processing Server System," Computergram International, No. 1658, Apr. 19, 1991.

Anon., "Financial Times Launches Content Through Netscape's In–Box Direct," Information Today, vol. 14, No. 3, pp. 1, 19, Mar. 1997.

Anon., "MSNBC Business Video and WavePhone Newscast Create Multimedia Business Intelligence Service," Information Today, vol. 15, No. 1., p. 25+, Jan. 1998.

www.dallasnews.com; "The Dallas Morning News Internet–Enhanced", pp. 1–7.

www.getcuecat.com; "Welcome Parade Readers"; Digital Convergence, p. 1.

www.forbes.com; "The Cue Cat", pp. 1–2.

www.crq.com; "Changing the Way You Surf the Internet"; pp. 1–3.

www.crq.com; "Welcome to Digital Convergence"; pp. 1–5.

www.cross.com; "Cross Convergence", p. 1.

www.dtint.com; "DTI Announces Speed URL: A New Patent Pending Solution for Linking Print and the Internet"; pp. 1–4.

www.editorandupublisher.com; "Gazette to use Gocode in Colorado Springs"; Sep. 8, 2000; pp. 1–2.

www.jumptech.com; Who We Are; p. 1.

www.jumptech.com; JumpTech news release; "Managing Director of Leading Dutch Publisher Joins Jumptech Board"; Minneapolis, MN, Nov. 20, 2000; pp. 1–2.

www.jumptech.com; JumpTech news release; "Jumptech.com's Print–To–Internet Technology Allows Dutch Publisher to Develop Internet–Enabled Newspaper"; Minneapolis, MN, Aug. 28, 2001, p. 1.

Majer, A. et al., NewMedia, vol. 9, No. 1, p. 11, published Jan. 1999.

Bango.Net, www.bango.net, 71 pages.

Internet Number, www.hatch.co.jp/e, 34 pages.

Anon., "MSNBC Business Video and WavePhore Newscast Create Multimedia Business Intelligence Service," Information Today, vol. 15, No. 1, p. 25+, Jan. 1998.

Anon, "Controversial Custom CD Patent Licensed by Super Sonic BOOM," Information Today, vol. 15, No. 5, p. 43, May 1998.

Anon, "Singapore: Vivamusic.com Opens Physical Store," Business Times, p. 12, Aug. 21, 2000.

* cited by examiner

| TRANS_TAB | |
|---|---|
| PRODUCT_ID | NUMBER |
| COMPANY_ID | NUMBER |
| FAR_COMPANY_ID | NUMBER |
| COMP_LEVEL | CHAR(1) |
| SERVICE_ID | NUMBER |
| CHANNEL_ID | NUMBER |
| EAN_CODE | VARCHAR2(128) |
| NAME | VARCHAR2(100) |
| URL_REI | VARCHAR2(1000) |
| LANGUAGE | VARCHAR2(5) |
| MARKET_REF_ID | NUMBER |
| MARKET_REF_CHILD_ID | NUMBER |
| ID_CODE | VARCHAR2(+) |
| SERVICE_TYPE | VARCHAR2(10) |
| CERTIFICATE | VARCHAR2(128) |
| PRE_URL | VARCHAR2(300) |
| POST_URL | VARCHAR2(300) |
| KEYWORD_ID | NUMBER |
| KEYWORD | VARCHAR2(30) |
| SERVICE_HOOK | VARCHAR2(10) |
| SERV_FRUI | VARCHAR2(1) |
| CHANNEL_TYPE_ID | NUMBER |
| CHANNEL | VARCHAR2(50) |
| CHANNEL_TYPE | VARCHAR2(10) |
| STATUS | CHAR(1) |
| SOURCE | VARCHAR2(16) |
| ACTION | CHAR(1) |
| CACHE_STAT | CHAR(1) |
| CHDATE | DATE |
| TRANS_ID | NUMBER |

FIG. 4B

OBJECT_DICT — 501
CODE
SYMBOLOGY
[ENTRY]

ENTRY — 502
SERVICE_ID
OBJECT_ID

OBJECT — 503
OBJECT_ID
[LINK]

LINK
LANGUAGE — 504
URL
DESCRIPTION

SERVICE
SERVICE_ID — 505
SERVICEDATA_ID
COMPANY_ID
SERVICEPARENT_ID

COMPANY
COMPANY_ID — 506
COMPANYPARENT_ID
COMPANYLEVEL
LOCKFLAG
[REFCOUNTRY_ID] — 507

REF_COUNTRY
REFCOUNTRY_ID
COUNTRY

SERVICE_DATA
SERVICEDATA_ID
CHANNEL_ID
NAME
PRIORITY — 508
SERVICETYPE
CERTIFICATE
PREURL
POSTURL
KEYWORD
SERVICEHOOK
DESCRIPTION

CHANNEL
CHANNEL_ID — 509
CHANNELTYPE_ID
NAME

CHANNEL_TYPE
CHANNELTYPE_ID — 510
CHANNELTYPE

FIG. 5

SCALABLE DISTRIBUTED DATABASE SYSTEM AND METHOD FOR LINKING CODES TO INTERNET INFORMATION

This application claims priority to U.S. Provisional Patent Application No. 60/252,906 entitled "Scalable distributed database system for linking URNs to Internet information" filed Nov. 27, 2000, which is hereby incorporated by reference.

FIELD OF THE INVENTION

The present invention relates to connecting an end user with locations on the Internet based on codes inputted by the end user.

BACKGROUND OF THE INVENTION

Bar code scanning technology has been in use for quite some time. Such bar codes appear on most items encountered by consumers every day—from grocery items to driver's licenses. Other types of codes (such as private codes), and methods for acquiring such codes, have been and are continuing to be developed. Bar codes and other codes allow for fast and easy identification, tracking, and inventory of items as well as storage of data relating to such items. As bar codes have become a common and familiar part of the consumer experience, so has the use of web services and applications. Different types of web services and applications continue to grow in number and popularity.

Identifying ways of converging these two apparently disparate technologies to create a product that provides mobility, simplicity, accuracy, convenience and efficiency to web applications and services would enable companies to reduce costs (by replacing formerly manual tasks with bar coding technology), increase revenue (by offering barcode-enabled advertising alternatives that allow consumers to learn about products, prices, store locations etc.), increase productivity (by automating sales force tasks such as product ordering), and improve customer loyalty (by offering barcode related value-added services to customers).

SUMMARY OF THE INVENTION

The present invention provides systems and methods related to the convergence of bar code and other coding technologies and web-based applications and services, thereby fulfilling a need present in the prior art.

In particular, the present invention is directed to a method and system for directing an end user to a location on a network based on a code inputted by the end user. The end user is associated with at least one of the following: an end-user country selection, an end-user language selection, a service category, an access media type, and the presence of an access certificate. The access media can be one of at least two types (at least one of the types being a bar code scanner). A database that includes a plurality of entries is provided. Each of the entries is associated with a machine-readable code and includes one or more different network addresses. The different network addresses are associated with different providers. Code information associated with one or more scans of machine readable codes, made by the end-user with a remote scanning device, is received at a network site. In response to the scan information, entries associated with the machine-readable codes scanned by the end-user are retrieved from the database. At least some of the entries include information that is not relevant to at least one of the end-user country selection, the end-user language selection, the service category, the access media type, and the presence of an access certificate. Based on at least one of the end-user country selection, the end-user language selection, the service category, the access media type, and the presence of an access certificate, one or more network addresses are selected from the retrieved entries. The end user is connected with the one or more network addresses selected.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and, together with the description, serve to explain the principles of the invention.

In the drawings:

FIGS. 4A through 4F illustrate an exemplary data structure that may be used to design a database in accordance with a preferred embodiment of a system of the present invention;

FIG. 5 illustrates a cache database schema that may be used to design a database in accordance with a preferred embodiment of a system of the present invention;

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention is directed generally to connecting a unique identifier, such as a bar code, to a URL that points to a web page on the Internet. The connection is tailored based on a number of different criteria including, for example, a particular language of the end user, the country of the end user, service categories chosen by the end user, and the media by which the end user accesses the system.

Figure 1:
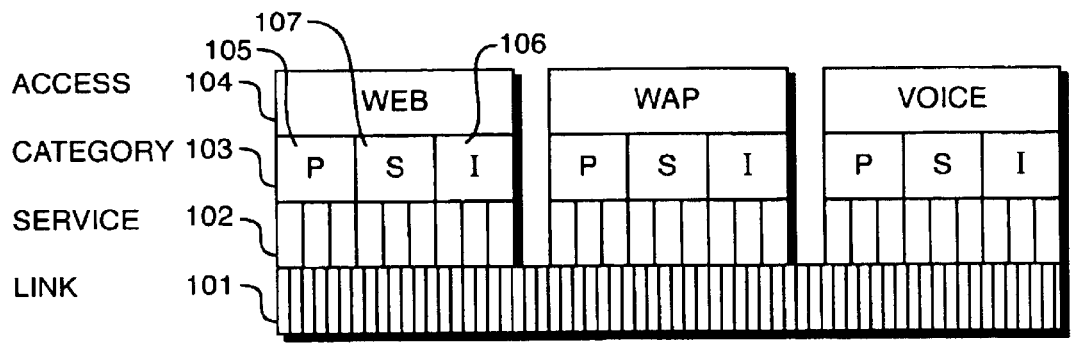
FIG. 1 illustrates the manner in which links may be organized in accordance with a preferred embodiment of the present invention.
Figure 2:
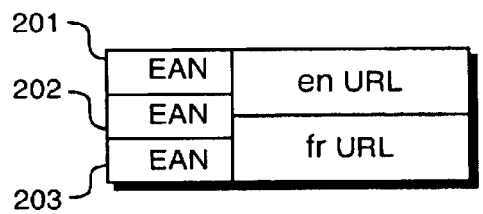
FIG. 2 illustrates a preferred embodiment of a link that can be used in connection with a preferred embodiment of the present invention.

FIG. 1 is a diagram illustrating a preferred embodiment of the manner in which URLs may be organized within the inventive system. Other categorizations, groupings and organizations will be known to those skilled in the art and are within the scope of the present invention. Link layer 101 represents a collection of one or more unique identifiers linked to one or more URLs (the combination of one or more unique identifiers linked to one or more URLs is referred to herein as a "Link"). In the preferred embodiment, the Links are grouped into different languages. FIG. 2 illustrates an example of a Link in which three EAN codes 201, 202 and 203 (i.e. unique identifiers) are linked to two different URLs 204 and 205 (one in English and one in French). In one embodiment, the unique identifier consists of a namespace and a number string that is namespace unique. This allows the inventive system to store in a database many types of unique identifiers (e.g. for barcodes, RFID tags, credit card numbers etc.). For example, an EAN-barcode, number 7331040021186, is represented by the namespace EAN13, and the string 7331040021186. By way of further example, a credit card issued by Company ABC with the card number 1234 5678 6543 would be represented by the namespace ABC and the string 123456786543. Other types of unique identifiers can be used in accordance with the present invention.

Service layer 102 contains collections of Links that are specific to particular companies (i.e., companies sponsoring the web pages to which the URLs point), each sharing properties of a particular service (i.e., groupings of Links that share a common characteristic). The shared characteristic may be, by way of example, an end user country of origin, language preference, profession, or access media device type. Other types of services based on any shared characteristics can be defined in accordance with the present invention.

For example, a French medical company marketing a painkiller product available only in France may create a service pursuant to which URLs pointing to marketing information on its painkiller product are presented only to users in France. Thus, the medical company could, for example, define two Links—a global Link and a French Link. A French user would be directed to URLs within the French Link, but everyone else in the world would be directed to URLs within the global Link. The medical company would, thus, have the ability to engage in a country-wide campaign for the painkiller for France, but still maintain the information about the product on the Internet for the rest of the world. A Canadian company may want to create two language preferences services, namely, a service for Links containing URLs directed to web pages written in English and a service for Links containing URLs directed to web pages written in French. By way of further example, a medical company may wish to present to doctors different URLs pointing to information for a painkiller product than those it presents to patients. The medical company would then create two services (one for doctors and one for patients) each of which holds a Link for different information relating to the painkiller product.

Figure 3:
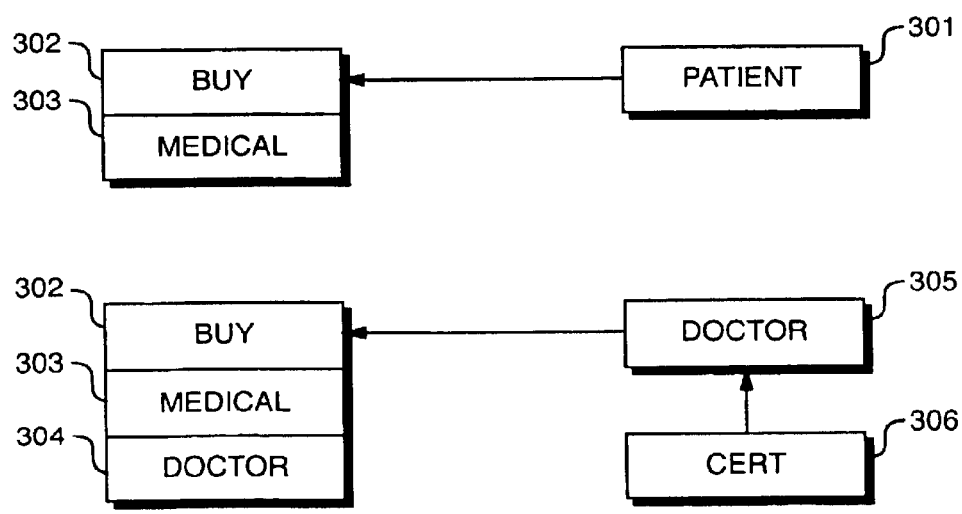
FIG. 3 illustrates the manner in which a user may be precluded from obtaining access to certain services in accordance with a preferred embodiment of the present invention.
Figure 4A:
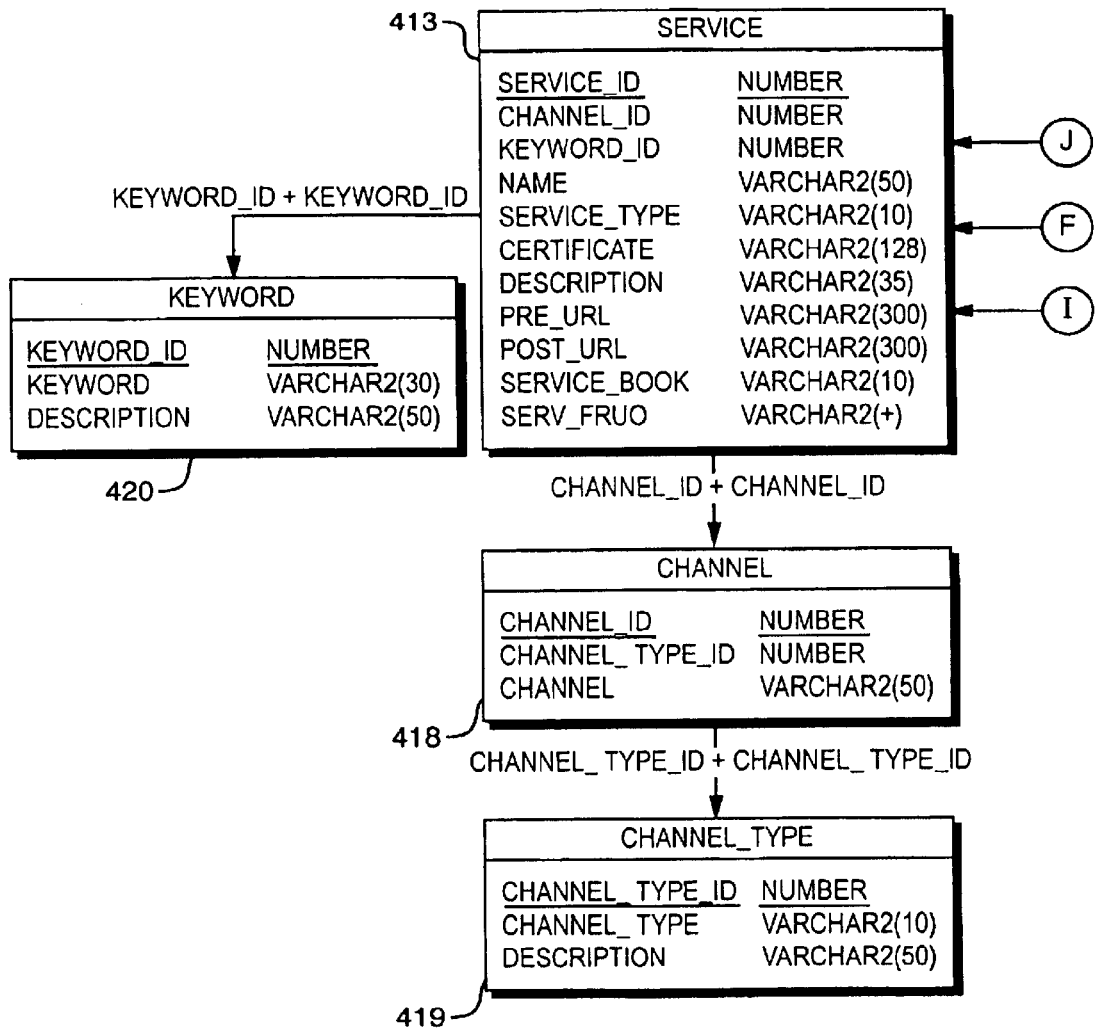
Figure 4C:
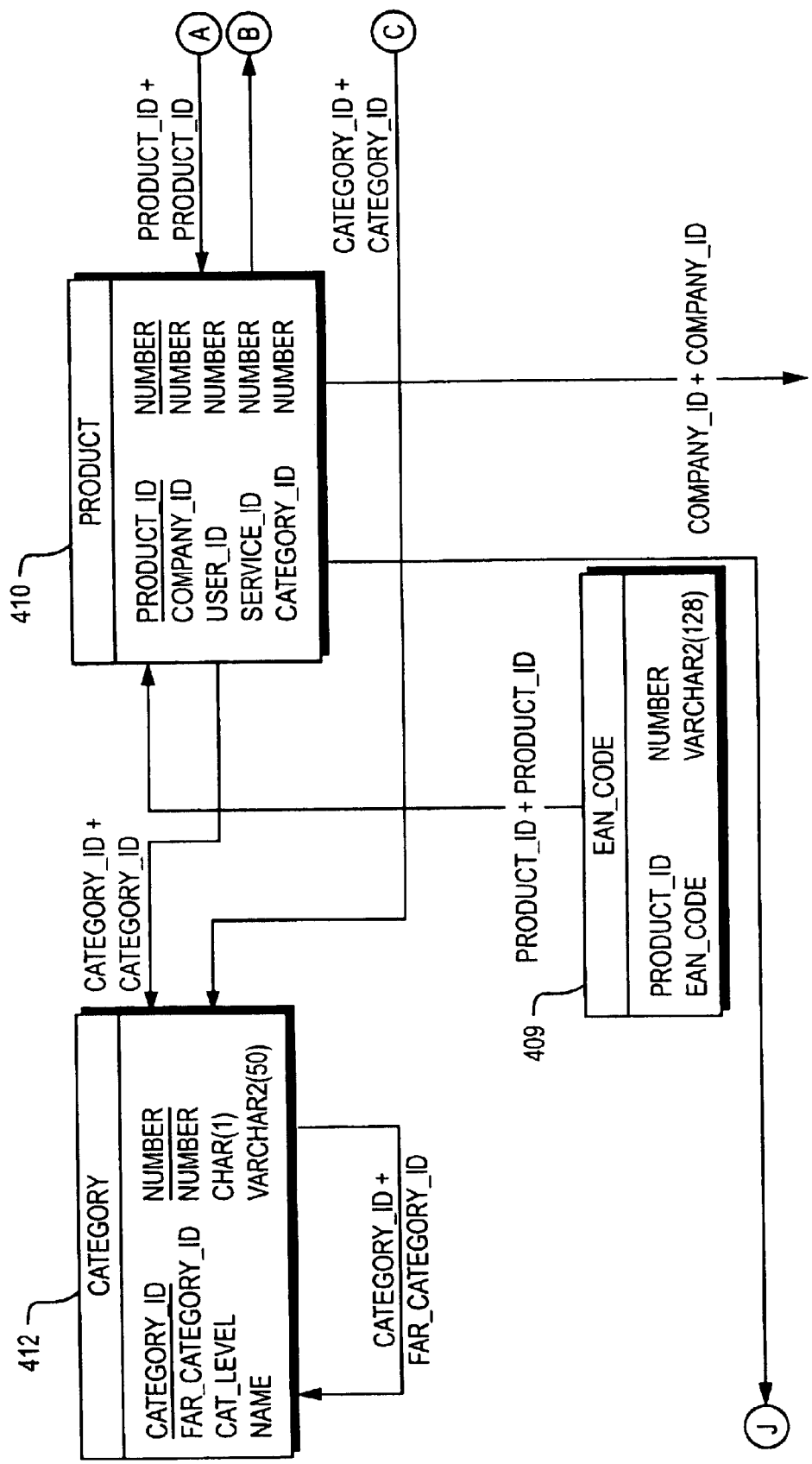
Figure 4D:
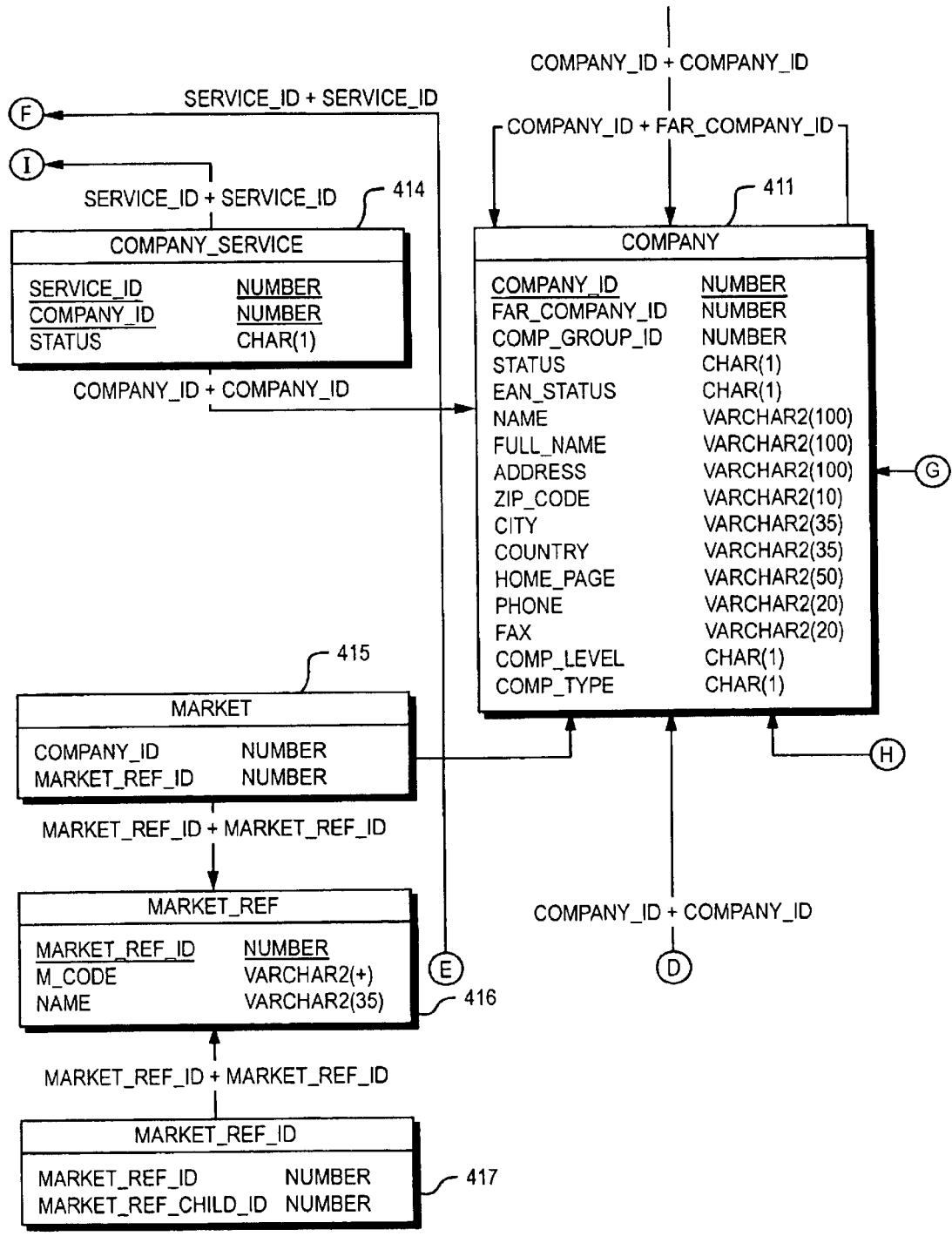
Figure 4E:
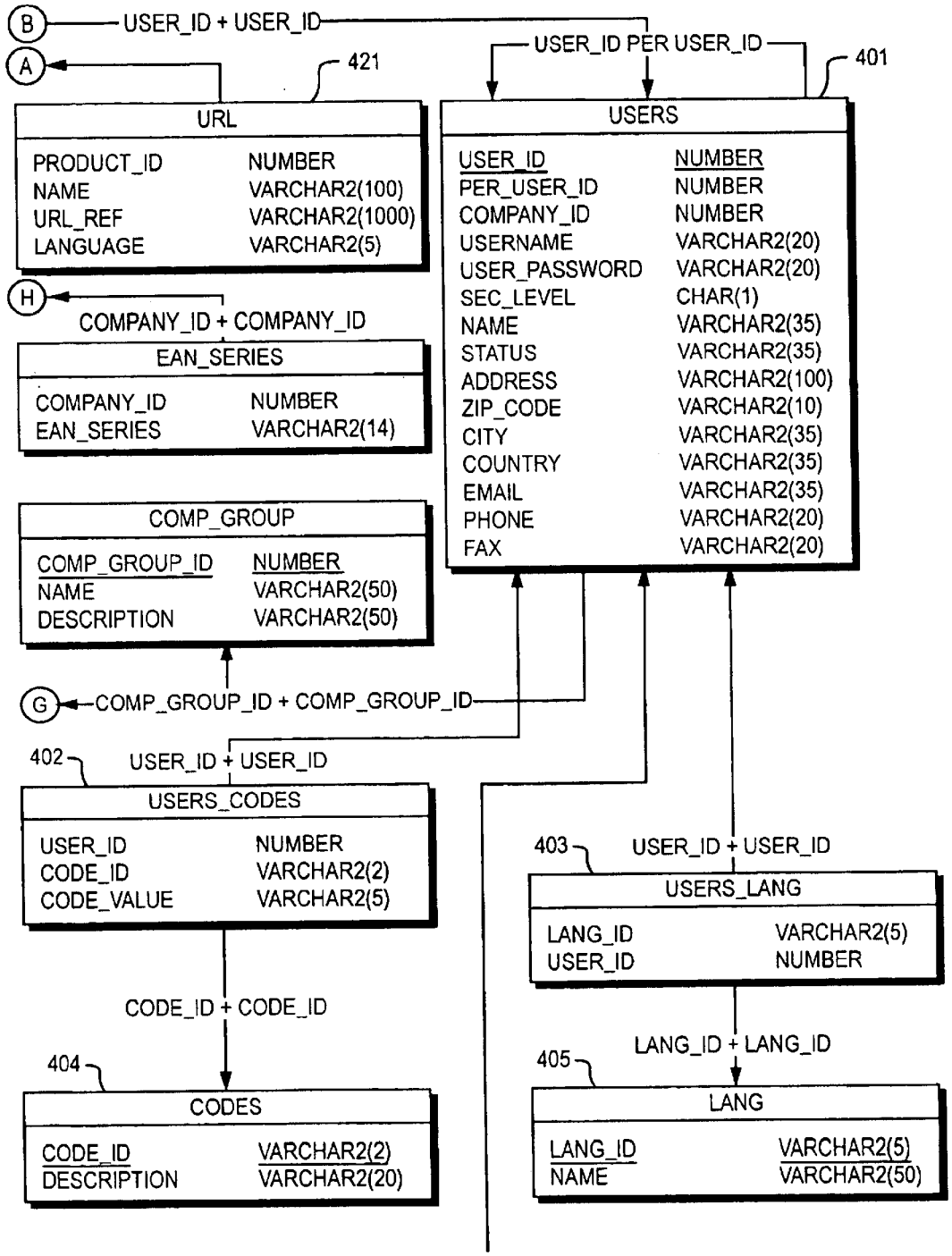
Figure 4F:
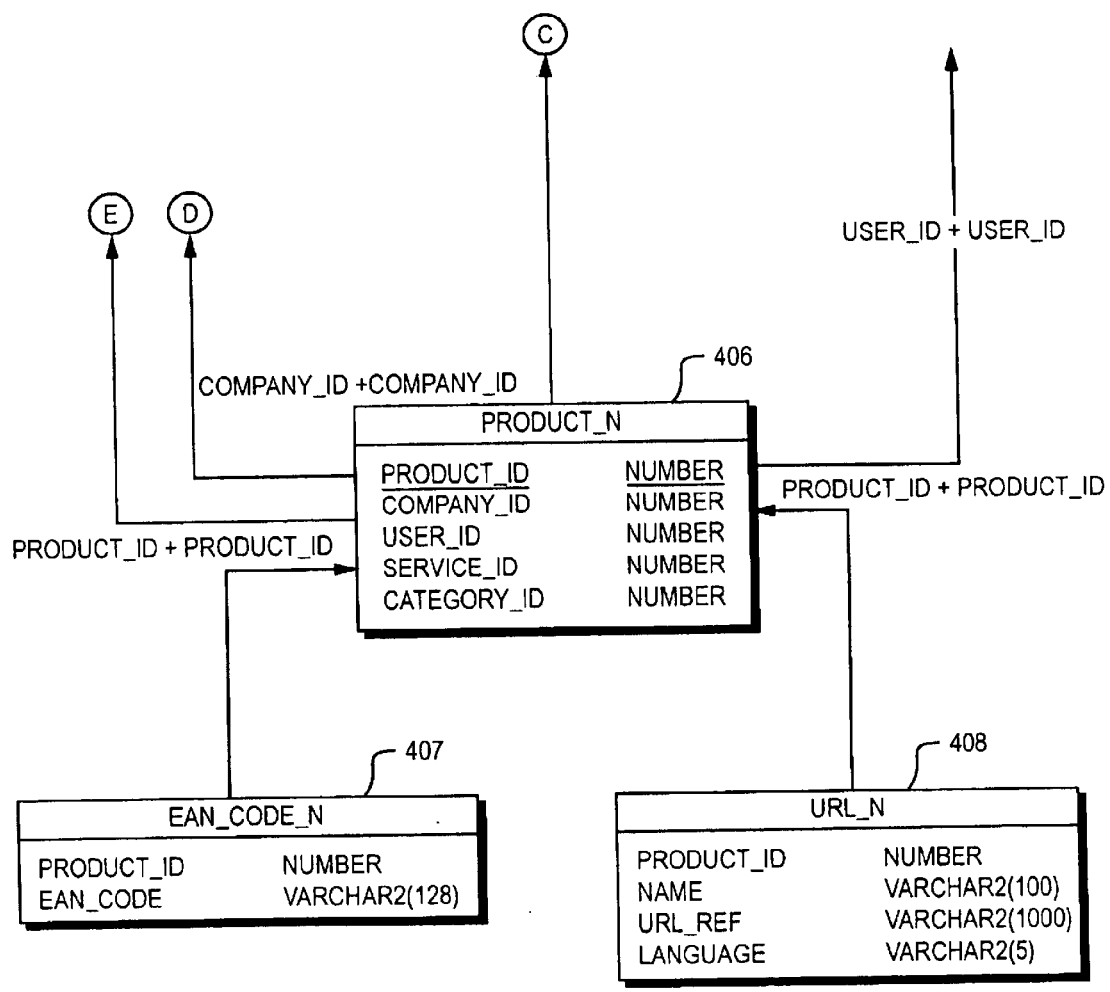

In some embodiments, a company may want to create services for Links to which only certain users or groups of users can obtain access. This can be accomplished using certificates. For example, one service may be created for Links containing URLs that can be accessed only by individuals that present a particular certificate. In a particular example, the French medical company may create a service that includes Links containing URLs that can be accessed only by individuals with a certificate proving that the individual is a doctor. FIG. 3 illustrates the manner in which a patient 301 has access to buy Link 302 and medical Link 303. However, doctor 305 has access not only to buy Link 302 and medical Link 303, but to doctor Link 304, because doctor 305 has certificate 306. Another service may be created that includes Links containing URLs that can be accessed only by end users using a particular device. For example, each barcode reader contains a serial number that is transmitted together with the barcode. Thus, certain Links may be protected by a service that provides access only to end users employing readers with certain serial numbers. This embodiment may be advantageous to a company seeking to make sure only its readers can be used for obtaining access to information about its products.

Category layer 103 controls how URLs are presented to the end user. Each service in service layer 102 may belong to a particular category. A category is a group of services that all share a common characteristic. The end user may select the categories of Links with which the end user is presented. Thus, for example, the end user may indicate that it is only interested in being presented with URLs relating to a particular product or, for example, to shopping sites.

One exemplary category is a product category 105 (shown in FIG. 1). All services relating to a particular kind of product will be grouped into product category 105. Information category 106 groups services that pertain to third party information about the service. Thus, for example, upon scanning a barcode for a video tape of a movie and choosing an information category, the end user will be presented with URLs pointing to reviews of the movie. Shopping category 107 groups services pertaining to Links with URLs identifying where an item can be purchased. Another type of category, an application category, groups Links by application, rather than merely by service, which implies a more advanced interface to the system. The API of the present invention provides access to a number of system-, device- and user parameters. A call to an application can be of several types, a simple re-direct or a general call with a flexible protocol. The APIs may differ depending on the type of access. Categories can be added, removed or changed on demand. Categories in addition to those described here can be created and used in the inventive system within the scope of the present invention.

Access layer 104 controls the URLs that are presented to the end user depending on the access media used by the end user. The different types of access media a user may employ include, by way of example, bar code readers (portable or tethered to a personal computer), personal computers, WAP enabled mobile phones, and personal digital assistants. Each grouping of Links in the category layer are specified as belonging to a certain access type. Thus, Links in a given category are tailor-made for a specific access type, which ensures that each device receives information that the specific device can handle. For example, categories may include Links that are tailored to be shown on the web or using WAP services. In another example, categories may include Links that are tailored to be heard as voice/music using a mobile phone. In particular, a record company wanting to promote one of their artists can have a Link (including URLs pointing to a web site where the artist's music track can be heard) assigned to a category for mobile phones. This music track can then be accessed using a barcode reader connected to a mobile phone. In another example, some categories may contain Links that are tailored to be sent back using Short Message Service ("SMS") to a mobile phone. In particular, an end user may scan a barcode on a book and receive an SMS back with a short review of the book. The end user may scan a barcode on a poster for a concert and receive an SMS back with an electronic ticket for the concert. Other access types can be provided for in the inventive system within the scope of the present invention.

Figure 6:
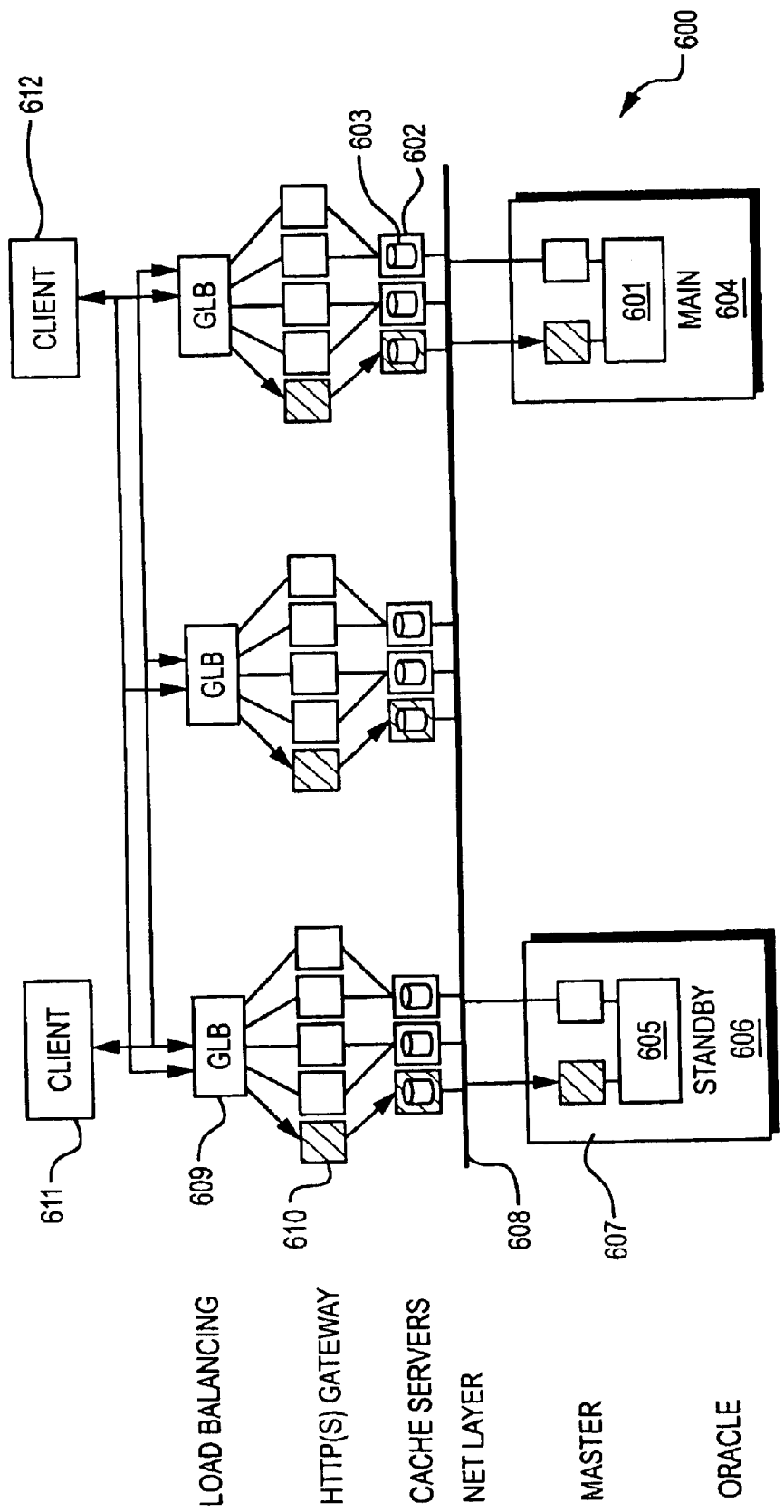
FIG. 6 illustrates a preferred embodiment of a system of the present invention.

Preferred embodiments of a central relational database and a cache database that may be used in connection with connecting end users to URLs in accordance with the present invention are described with reference to FIGS. 4A through 4F and 5, respectively. FIGS. 4A through 4F illustrate an exemplary data structure of central relational database 601 (shown in FIG. 6) for storing data used in connection with the present invention. FIG. 5 illustrates a preferred embodiment of a schema of cache database 603 (also shown in FIG. 6). Cache database 603 is designed, in the preferred embodiment, to handle lookup requests with a high degree of performance in terms of speed and capacity. This is accomplished through a combination of the database architecture and RAM caching. In particular, the cache database is, in the preferred embodiment, an object oriented hash based database, not a relational database. Each table in the cache database has a RAM cache.

With reference to FIGS. 4A through 4F, central relational database 601 includes a number of tables. Tables 401, 402, 403, 404 and 405 allow companies to set up and access accounts, and create and manipulate data relating to Links. For example, table 401 is used to store data on the company, such as identification information, password, address and other contact information. Each company has associated with it one or more users that enter information into the system. Tables 402 and 404 are used to store preferences for each user in the system (e.g., whether the user prefers help screens, whether the user prefers to have URLs confirmed prior to their entry into the system etc.). Tables 403 and 405 are used to store information relating to a language preference for the user as well as to set templates for the language fields used by the user when entering Link information. Tables 406, 407 and 408 are used to store and manipulate codes implemented by a company in bulk.

Table 410 is used to store product information and, in particular, Links based on unique identifiers from table 409 and URLs from table 421. For each product identified in table 410, information regarding the company sponsoring the product can be identified from table 411, along with information regarding the user that inserted the product into the system (identified from table 401). Each product identified in product table 410 is associated with a particular service (identified in table 413), and a category (identified in table 412).

Company data stored in table 411 is associated with data relating to a particular market, stored in tables 415, 416 and 417. Service data stored in table 413 is associated with channel information stored in table 418 and channel type information (i.e. access media device type) stored in table 419, as well as service information stored in table 414. Keyword data, stored in table 420, is used to further separate services that share a common characteristic within a category. For example, two shopping services A (a book store) and B (a pet shop) are separated by the keywords bookstore for service A and pet shop for service B. Service information stored in table 414 relates services of a particular type (defined in table 413) that are owned and shared by a number of companies (defined in table 411).

The lookup procedure can be described with reference to FIG. 5, which illustrates several exemplary tables of cache database 603. Based on a particular code inputted by an end user (e.g., scanned) and the symbology of that code, object dictionary table 501 is used to obtain all entries (each of which includes a service ID and an object ID) from entry table 502. All data associated with the service ID and object ID for each entry is then obtained. In particular, for each object ID, a link is identified from object table 503 and, for each link, link data is obtained from link table 504. For each service ID, a service parent ID is determined from service table 505. The service parent ID allows the inventive system to identify whether a particular service is globally valid or whether the service pertains only to a particular country.

Also, for each service ID, using service table 505, a company ID (identifying the company that has inserted the service into the system) is identified. Using the company ID, company information is obtained from company table 506. The company information includes, for example, whether a parent company exists as well as whether the company is active in the system. Based on the reference country ID in company table 506, country data is obtained from reference country table 507.

Returning again to service table 505, a service data ID is identified. Using the service data ID, service data information is obtained from service data table 508. The service data information includes, for example, the name for the service, whether a priority has been set, the type of service, whether any certificates are required to access the service, and a description of the service. The service information (in particular, "pre_url" and "post_url") allows for the construction of URLs from strings defined in the service. "Service hook" determines whether such URLs should be constructed and what type of URL compositing should occur. From service data table 508, a channel ID is determined, which allows channel data (i.e. category information described with reference to FIG. 1) to be obtained from channel table 509. From channel table 509, a channel type ID is determined which allows channel type data (i.e. access media device type) to be obtained from channel type table 510.

The superset of data identified is then filtered to obtain Links that are particular to the current end user session. In particular, as discussed in more detail above, Links that are not associated with the country from which the end user has inputted the code; the preferred language of the end user; the channel (i.e. categories); and/or the channel type (access media) being used by the end user, are removed. In addition, if a certificate is required for access to a particular Link (identified in service data table 508), and the end user does not possess the required certificate, such Links are removed. The information relating to the country from which the end user has inputted the code; the preferred language of the end user; the channel and/or channel type may be provided directly or automatically from the user's access media to site 604 (identified in FIG. 6) either via a cookie stored on the access media, based on user selections that have previously been stored on the access media or other ways known in the art. U.S. Pat. No. 6,314,457, which is hereby incorporated by reference, provides a description of exemplary access media that can be used in accordance with the present invention. The end user is then presented with the remaining Links. In some embodiments, companies may set priorities within the system (identified in service data table 508), thereby controlling the order in which Links are presented to end users.

A preferred embodiment of a system 600 that may be used to support the linking of unique identifiers to URLs using databases of the type described above is illustrated with reference to FIG. 6. Variations on the components and configuration of the system 600 will be known to those skilled in the art and are within the scope of the present invention. The system described herein is highly scalable, thereby enabling it to handle a large number of Links. Further, the system is also designed to handle many end user lookups per second. The system also provides for both global and local load balancing, is stable and highly reliable.

System 600 includes a central relational database 601 (e.g., as described with reference to FIGS. 4A through 4F) for storing all information used in connection with system 600. Central relational database 601, for example, handles the companies' member accounts, which are used for online insertion or deletion of Links. Central relational database 601 is maintained on a central site 604 and one or more cache databases 603 (e.g., as described with reference to FIG. 5) are maintained on cache servers 602. In a preferred embodiment, system 600 includes a standby relational database 605 on standby site 606 that is a real time mirror of central relational database 601. In case of a crash or scheduled downtime on the central relational database 601, the standby relational database 605 will take over.

Updates to the system 600 (for example, the addition of new Links) are handled through the central relational database 601 and are propagated to the cache-server databases 603. In particular, when changes are made in central relational database 601, that information is extracted by the master cache server 607 (recording the change in its transaction log database) and broadcasted through net layer 608 to the different database sites, from which the data is retrieved by the cache servers 602 and stored in cache databases 603. The transaction log works as a persistent buffer such that cache servers 602 that are brought on line can obtain transactions missed while offline.

Lookups are handled from the Internet through the global load balancing layer (GLB) 609 to whichever web server 610 at the site has the shortest latency and load. The web server 610 connects to any of the cache servers 602 at the site and performs the lookup in the various tables (as described with reference to FIG. 5). The result of the lookup is then transmitted back to the end user client 611 via the web servers 610. As lookups are being performed, statistics for each lookup request are gathered by the cache servers 602. That data is then sent at regular intervals back to the master cache server 607 that inserts the data into the central relational database 601.

In the preferred embodiment, operations in the system 600 can be performed in two modes: read only or read write. When in read write mode, the operations to the database are guarded through transactions, whereas, in read only mode, the system will bypass normal transaction handling. In this manner, lookup operations will not interfere with insert or delete operations, thereby allowing lookup operations to be performed without transaction locks, which greatly enhances the performance of the system.

Company accounts are managed through an administration site internal to system 600, which is also connected to the central relational database 601. Company clients 612 (i.e. local clients at companies sponsoring web pages to which the URLs point) can connect securely using a standard web browser through one more or HTTPS servers (i.e. web servers 610) at each site. The connection is load balanced just as the end-user lookup requests. An application program interface (API) provides a remote way of accessing central relational database 604. This allows for company clients 612 that are running locally at the company to connect to and change the contents of the Mcentral relational database 604 (for example, to access their accounts and manage their Links). The API requests are directed from the web servers 610 to one of cache servers 602, that transmits the request back to one of master servers 607, that connects to the central relational database 604 and performs the request. The result is transmitted back from the cache master server 607 to the cache server 602, to the web server 610, that transmits it back to the API and the remote company client 612.

Thus, for example, a plugin to a desktop publishing program allows a newspaper editor to retrieve and link up barcodes that can be used in magazines. The plugin allows the editor to login to his account in the system 600 and directly manage his Links from within the desktop publishing program. Each barcode can be retrieved through the tool as an image to be printed in the magazine.

As mentioned previously, a preferred embodiment of the system 600 uses global load balancing in order to meet demands in different parts of the world. This is also important for ensuring low latency and high reliability. The global load balancers 609 that the system 600 uses act like a global web server that routes requests through to the most suitable site. In particular, when a DNS request is made to a global load balanced system (such as system 600), load balancers 609 intercept the request and, depending on different parameters such as server health, site capacity, and round trip time, return the IP address of the site which is most suitable. At each site, local load balancing is used to increase performance and ensure site level reliability. In particular, the local load balancer distributes the load between local servers at a site to increase the lookup capacity at a particular site. Extending performance of the system 600 is, thus, simplified. In the event a need arises to add more capacity to a particular site, new hardware can be added to that site. In the event more capacity is needed in another part of the world, a new site can be added to the global system. Other load balancing schemes will be known to those skilled in the art.

Figure 7:
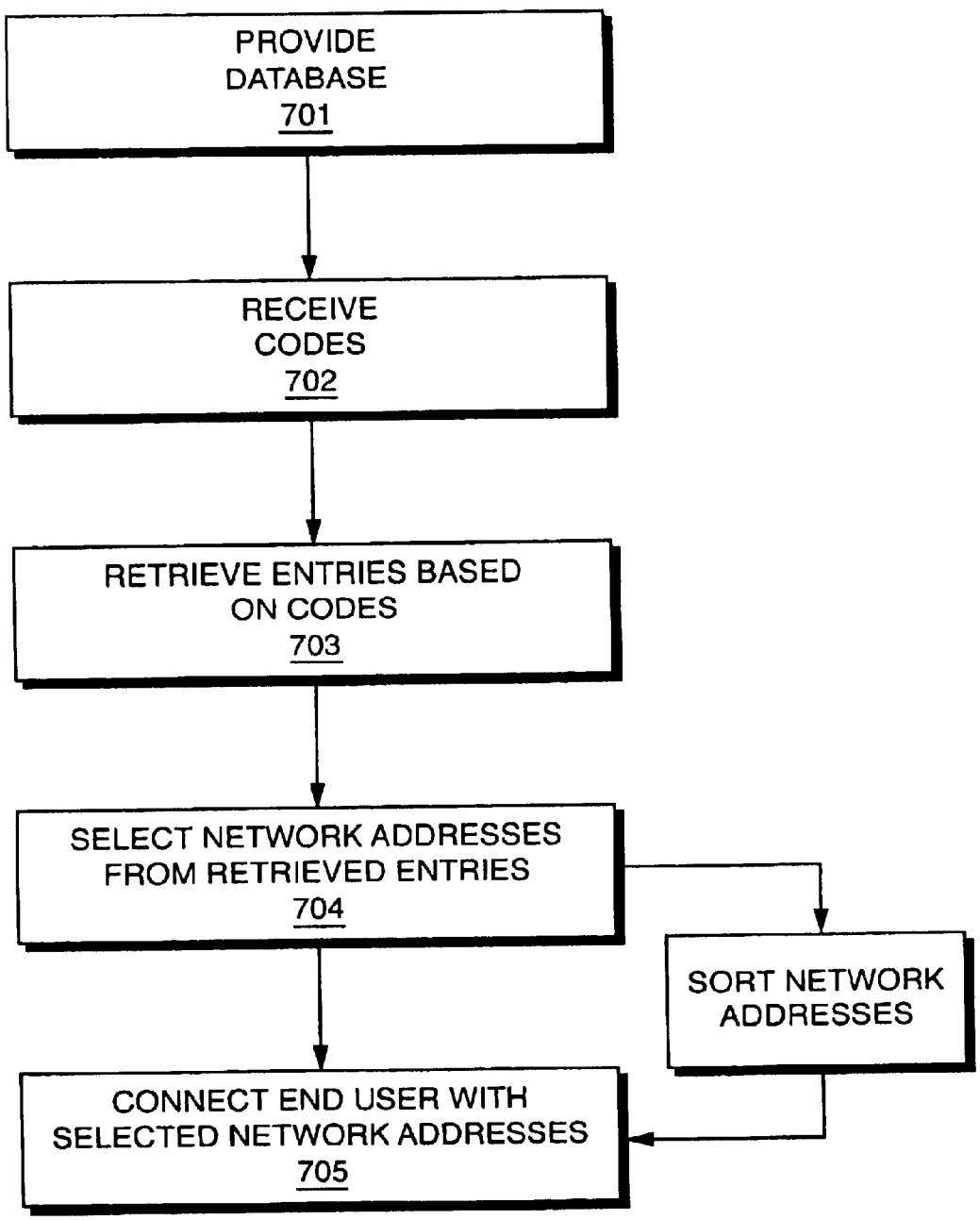
FIG. 7 illustrates a flow chart of a preferred embodiment of a method for connecting end users to Internet information based on codes inputted by the end users.

FIG. 7 is a flow chart illustrating a method for directing an end-user to a location on a network. The end-user is associated with at least one of the following: an end-user country selection, an end-user language selection, a service category, an access media type, and the presence of an access certificate. The service category may be a product- or service-specific category or a third party service provider category. The service category in effect for a session may be chosen by the end user. The access media can be one of at least two types (at least one of the types being a bar code scanner). In step 701, a database that includes a plurality of entries is provided. Each of the entries is associated with a machine-readable code and includes one or more different network addresses. The different network addresses are associated with different providers (i.e. companies). In some embodiments, the entries further include one or more services, each service comprising a collection of network addresses grouped in accordance with at least one shared characteristic. The shared characteristic may be an identified profession; a country of origin; a language; or an access media device type, for example.

In step 702, code information associated with one or more scans of machine readable codes, made by the end user with a remote scanning device, is received at a network site. In step 703, in response to the scan information, entries associated with the machine-readable codes scanned by the end user are retrieved from the database. At least some of the entries include information that is not relevant to at least one of the end-user country selection, the end-user language selection, the service category, the access media type, and the presence of an access certificate. In step 704, based on at least one of the end-user country selection, the end-user language selection, the service category, the access media type, and the presence of an access certificate, one or more network addresses are selected from the retrieved entries. In step 705, the end user is connected with the one or more network addresses selected in step 704. In some embodiments, in step 706, the network addresses are sorted based on a provider-indicated priority.

Although the foregoing description is directed to the preferred embodiments of the invention, it is noted that other variations and modifications will be apparent to those skilled in the art, and may be made without departing from the spirit or scope of the invention.

What is claimed is:

1. A method for directing an end-user to a location on a network, the end-user being associated with at least one of an end-user country selection, an end-user language selection, a service category, an access media type, the access media type comprising at least two types of access media at least one of which comprises a bar code scanner, and presence of an access certificate, the method comprising:

A. providing a database comprising a plurality of entries each of which is associated with a machine-readable code, wherein the entries comprise one or more different network addresses, the different network addresses being associated with different providers;

B. receiving at a network site code information associated with one or more scans of machine readable codes made by the end-user with a remote scanning device;

C. retrieving from the database, in response to the scan information, entries associated with the machine-readable codes scanned by the end-user, at least some of the entries comprising information irrelevant to at least one of the end-user country selection, the end-user language selection, the service category the access media type, and the presence of an access certificate;

D. based on at least one of the end-user country selection, the end-user language selection, the service category, the access media type, and the presence of an access certificate, selecting one or more network addresses from the retrieved entries; and E. connecting the end user with the selected one or more network addresses, wherein the entries further comprise one or more services, each service comprising a collection of network addresses grouped in accordance with at least one shared characteristic.

2. The method of claim 1 further comprising:

F. sorting the one or more network addresses based on a provider indicated priority.

3. The method of claim 1 wherein the shared characteristic comprises an identified profession.

4. The method of claim 1 wherein the shared characteristic comprises a country of origin.

5. The method of claim 1 wherein the shared characteristic comprises a language.

6. The method of claim 1 wherein the shared characteristic comprises an access media device type.

7. The method of claim 1 wherein the service category is indicated by the end user.

8. The method of claim 1 wherein the service category comprises a product-specific category.

9. The method of claim 1 wherein the service category comprises a service-specific category.

10. The method of claim 1 wherein the service category comprises a third party service provider category.

11. A system for directing an end-user to a location on a network, the end-user being associated with at least one of an end-user country selection, an end-user language selection, a service category, an access media type, the access media type comprising at least two types of access media at least one of which comprises a bar code scanner, and presence of an access certificate, comprising:

a database comprising a plurality of entries each of which is associated with a machine-readable code, wherein the entries comprise one or more different network addresses, the different network addresses being associated with different providers;

a network site that receives code information associated with one or more scans of machine readable codes made by the end-user with a remote scanning device;

one or more processors that, in response to the code information, retrieve from the database entries associated with the machine-readable codes scanned by the end-user, at least some of the entries comprising information irrelevant to at least one of the end-user country selection, the end-user language selection, the service category, the access media type, and the presence of an access certificate; and that, based on at least one of the end-user country selection, the end-user language selection, the service category, the access media type, and the presence of an access certificate, select from the retrieved entries one or more network addresses: and that connect the end user with the selected one or more network addresses, wherein the entries further comprise one or more services, each service comprising a collection of network addresses grouped in accordance with at least one shared characteristic.

12. The system of claim 11 wherein the processors further sort the one or more network addresses based on a provider indicated priority.

13. The system of claim 11 wherein the shared characteristic comprises an identified profession.

14. The system of claim 11 wherein the shared characteristic comprises a country of origin.

15. The system of claim 11 wherein the shared characteristic comprises a language.

16. The system of claim 11 wherein the shared characteristic comprises an access media device type.

17. The system of claim 11 wherein the service category is indicated by the end user.

18. The system of claim 11 wherein the service category comprises a product-specific category.

19. The system of claim 11 wherein the service category comprises a service-specific category.

20. The system of claim 11 wherein the service category comprises a third party service provider category.

* * * * *